United States Patent [19]

Reber et al.

[11] Patent Number: 5,706,421
[45] Date of Patent: Jan. 6, 1998

[54] METHOD AND SYSTEM FOR REPRODUCING AN ANIMATED IMAGE SEQUENCE USING WIDE-ANGLE IMAGES

[75] Inventors: William Louis Reber, Schaumburg, Ill.; Cary Drake Perttunen, Shelby Township, Mich.

[73] Assignee: Motorola, Inc., Schaumburg, Ill.

[21] Appl. No.: 431,185

[22] Filed: Apr. 28, 1995

[51] Int. Cl.$^6$ ................................................ H04N 5/262
[52] U.S. Cl. .................................................... 395/173
[58] Field of Search ............................... 395/152, 135, 395/173, 174, 175

[56] References Cited

U.S. PATENT DOCUMENTS

| | | | |
|---|---|---|---|
| 3,510,210 | 5/1970 | Haney | 352/39 |
| 4,463,380 | 7/1984 | Hooks, Jr. | 358/160 |
| 5,185,665 | 2/1993 | Okura et al. | 358/183 |
| 5,185,667 | 2/1993 | Zimmermann | 358/209 |
| 5,353,392 | 10/1994 | Luquet et al. | 395/135 |
| 5,384,912 | 1/1995 | Ogrinc et al. | 395/164 |

OTHER PUBLICATIONS

"Peering Out a 'Real Time' Window" by Peter H. Lewis, The New York Times, Wednesday, Feb. 8, 1995.

*Primary Examiner*—Phu K. Nguyen
*Assistant Examiner*—Cliff N. Vo
*Attorney, Agent, or Firm*—Bruce E. Stuckman; Jeffrey G. Toler

[57] ABSTRACT

A system for producing an animated image sequence comprises an image processor and an animated character generator. The image processor processes a portion of at least one wide-angle image to form an image signal representative of at least one perspective corrected image. The animated character generator is responsive to the image signal and at least one control signal for generating an animated character within the at least one perspective corrected image. The animated character has at least one graphical member which moves in dependence upon the at least one control signal. In a preferred embodiment, the system further comprises at least one sensor for sensing a position of a body member of a user. The position of the body member is used to control the movement of a graphical member corresponding to the body member.

24 Claims, 3 Drawing Sheets

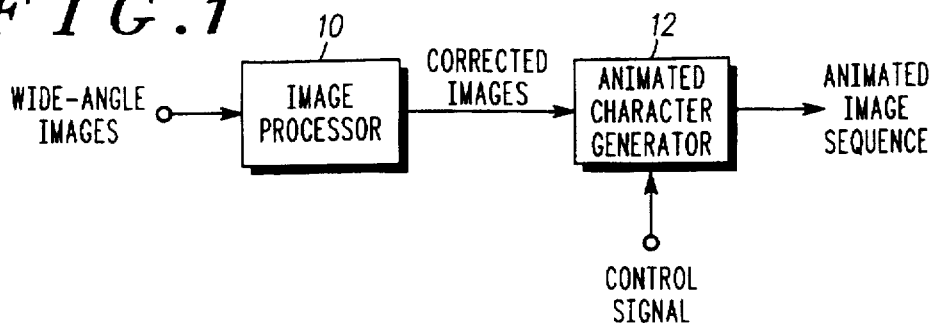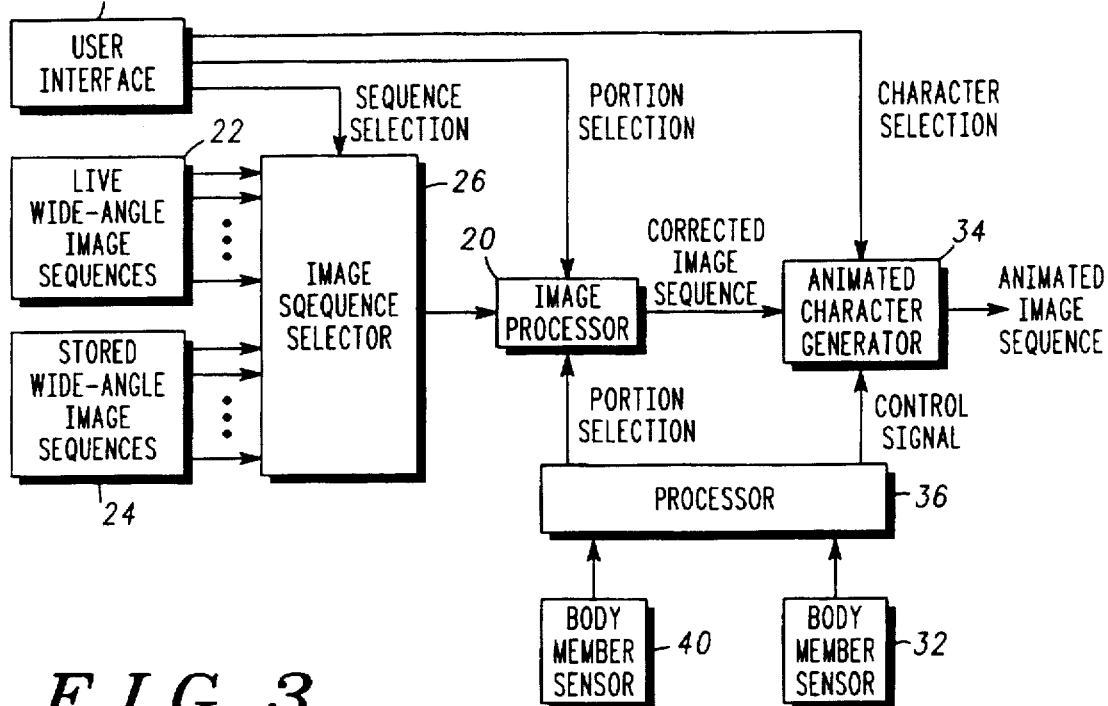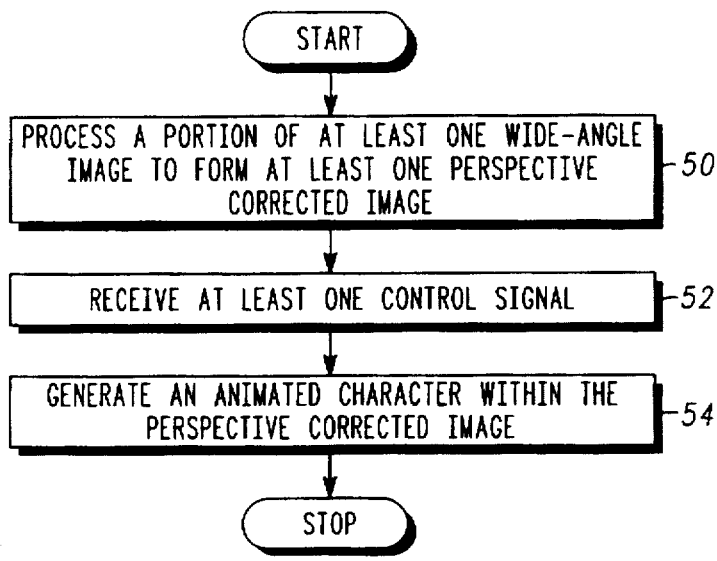

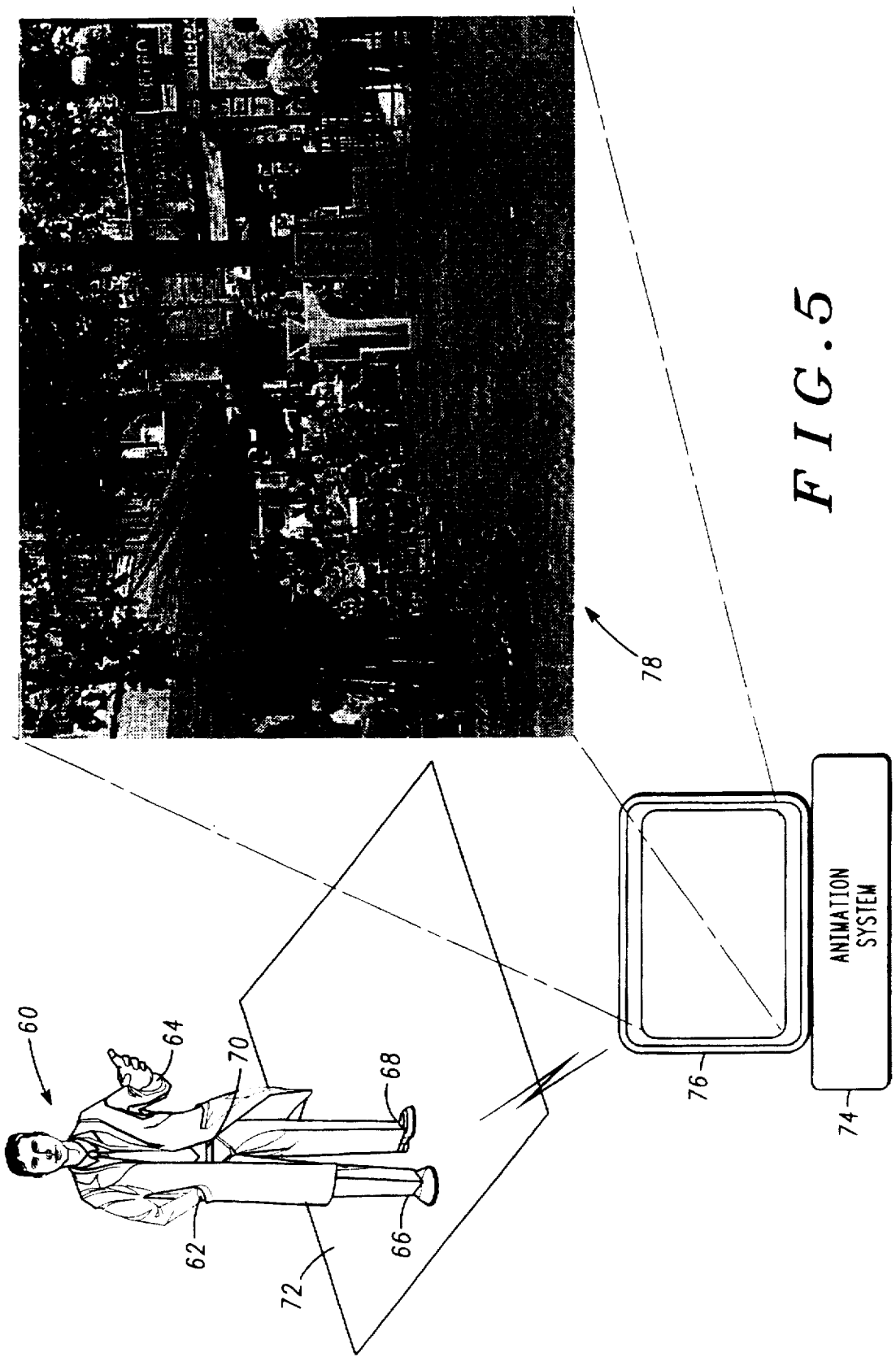

METHOD AND SYSTEM FOR REPRODUCING AN ANIMATED IMAGE SEQUENCE USING WIDE-ANGLE IMAGES

RELATED INVENTIONS

The present invention is related to the following inventions which are assigned to the same assignee as the present invention:

(1) "Method and System for Interactively Viewing a Broadcast Program", having Ser. No. 08/392,705, filed Feb. 23, 1995; and (2) "Method and System for Broadcasting an Interactively Viewable Program", having Ser. No. 08/392,593, filed Feb. 23, 1995.

The subject matter of the above-identified related inventions is hereby incorporated by reference into the disclosure of this invention.

FIELD OF THE INVENTION

The present invention relates to methods and systems for producing an image sequence having an animated character generated therewithin.

BACKGROUND OF THE INVENTION

Improvements in the speed and storage capabilities of affordable computer workstations have facilitated an increase in the scope of application of computer-based animated character generation systems. Colossal Pictures, located in San Francisco, Calif., has developed a computer-based animated character generation system used to produce the "Moxy" cartoon character seen on The Cartoon Network. The "Moxy" character is animated by a computer in real-time using a performer who is equipped with a plurality of position and orientation sensors. Movements of the performer are sensed in real-time, and mimicked by the "Moxy" character.

The "Moxy" character is typically located in the foreground or midground of images produced by the animated character generation system. The background of these images may be based upon one or more standard captured images or illustrations, and may be either static or dynamic in nature.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 1 is a block diagram of an embodiment of a system for producing an animated image sequence;

FIG. 2 is a block diagram of another embodiment of a system for producing an animated image sequence;

FIG. 3 is a flow chart of an embodiment of a method of producing an animated image sequence;

FIG. 5 is an illustration of another single image of an animated image sequence formed in accordance with embodiments of the present invention.

DETAILED DESCRIPTION OF A PREFERRED EMBODIMENT

Figure 4:
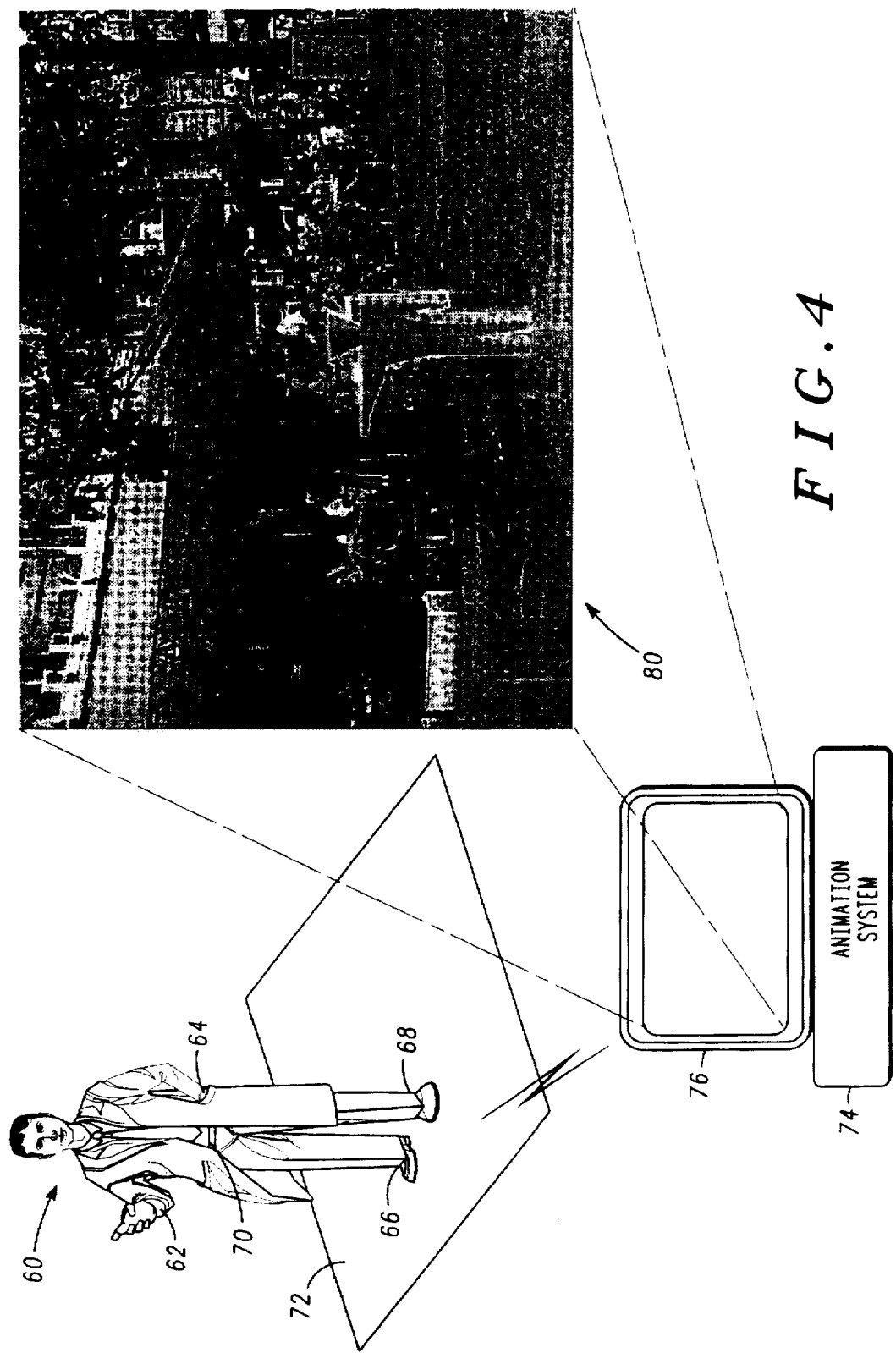
FIG. 4 is an illustration of a single image of an animated image sequence formed in accordance with embodiments of the present invention.

Embodiments of the present invention advantageously produce an animated image sequence having an animated character contained within a perspective corrected portion of at least one wide-angle image. By both generating an animated character and processing a real-world wide-angle image sequence in real-time, real-time interaction is possible between the animated character and a distant real-world environment.

FIG. 1 is a block diagram of an embodiment of a system for producing an animated image sequence. The system comprises an image processor 10 which receives an input signal representative of at least one wide-angle image. The image processor 10 processes a portion of the at least one wide-angle image to form a signal representative of at least one perspective corrected image.

The at least one wide-angle image may be captured using a camera having a wide-angle lens. One of a variety of wide-angle lenses may be employed to produce a desired angular field of view of the at least one wide-angle image. The angular field of view of the at least one wide-angle image is preferably greater than 50 degrees, and more preferably, is greater than 120 degrees.

It is also preferred that the at least one wide-angle image has a portion or all (a subset) of a spherical field of view. Further, it is preferred that all of a plurality of objects in the field of view are substantially in focus in the at least one wide-angle image. These two properties may be produced, for example, using a fisheye lens as an optical element in the camera; however, other wide-angle lenses which use either traditional optics or holographic elements are also suitable for this application. The use of a plurality of cameras and a control system for aggregating images captured thereby can also provide a wide-angle image which includes a spherical field of view. While all of these embodiments of the present invention are possible, the examples which follow are presented in terms of a preferred embodiment wherein each of the at least one image has a substantially hemispherical field of view with all objects contained therein being substantially in focus.

The at least one wide-angle image may include a plurality of successively-captured images which form a wide-angle image sequence. The wide-angle image sequence may provide, for example, a live view or a prerecorded view of a predetermined environment. In these cases, it is desirable for the image processor 10 to be capable of producing a perspective corrected image sequence from a wide-angle image sequence in real-time. U.S. Pat. No. 5,185,667 to Zimmermann ("the Zimmermann patent"), which is incorporated herein by reference, discloses embodiments of methods and systems for electronically processing a portion of a wide-angle image sequence in real-time. Real-time image processing allows the perspective corrected image sequence to be produced from a live aerial, land, or undersea view of a portion of the Earth captured by a camera with a wide-angle lens.

The system further comprises an animated character generator 12 which is responsive to the image signal formed by the image processor 10 and at least one control signal. The animated character generator 12 generates an animated character within the at least one perspective corrected image produced by the image processor 10. The animated character is illustrative of an animate entity which interacts with the at least one perspective corrected image. As such, the animated character may illustrate an anthropomorphic being, an animal-like creature, a plant, an android, a robot, etc. In a basic form, the animated character generator 12 superimposes the animated character onto the at least one perspective corrected image so that the animated character appears to be within a predetermined environment. In general, the animated character may be produced in either the foreground, the midground, or the background of the at least one perspective corrected image.

The animated character has at least one graphical member which moves in dependence upon the at least one control signal received by the animated character generator 12. The at least one graphical member may illustrate body members of the animated character, such as its arms, legs, eyes, mouth, and/or head. The at least one control signal is utilized for moving the body members of the animated character to allow the animated character to interact with the perspective corrected image produced by the image processor 10. The animated character generator 12 produces an output signal representative of an image sequence containing the animated character within the portion of the at least one wide-angle image.

FIG. 2 is a block diagram of another embodiment of a system for producing an animated image sequence. An image processor 20 receives a first input signal representative of a wide-angle image sequence and second input signals which identify a portion of the wide-angle image sequence. The image processor 20 processes the portion of the wide-angle image sequence to form an image signal representative of a perspective corrected image sequence.

The input signal representative of the wide-angle image sequence is selected from a plurality of live wide-angle image sequences 22 and a plurality of stored wide-angle image sequences 24 using an image sequence selector 26. The image sequence selector 26 can be embodied, for example, by either a mechanical or a physical switching device.

The live wide-angle image sequences 22 may be produced by a plurality of cameras installed in different environments. For example, the live wide-angle image sequences 22 may provide views of cities around the world, various scenic wonders, and other locations of interest on the Earth. The stored wide-angle image sequences 24 may be stored in an analog format such as on video tape or film, or in a digital format on a mass storage device such as a tape, disk, CD-ROM, or memory.

The system further includes a user interface 30 operatively associated with the image processor 20 and the image sequence selector 26. The user interface 30 allows a user to indicate a selected one of the image sequences to be provided to the image processor 20 by the image sequence selector 26. The user interface 30 is further utilized for selecting the portion of the wide-angle image sequence, and more generally, for selecting the portion of the at least one wide-angle image. For these purposes, the user interface 30 includes an input device such as one or more buttons, a keyboard, a mouse, a joystick, a lightpen, a trackball, a touchpad, or a touchscreen, to permit a user to select the wide-angle image sequence and the portion thereof.

The system further includes a sensor 32 which senses a quantity based upon a position of a body member of the user, and generates a sensor signal based upon the quantity. The quantity may be representative of position, displacement, orientation, velocity, acceleration, or another position-based quantity, of a body member of the user. Examples of the body member include, but are not limited to, an arm, a leg, a finger, a head, a foot, a mouth, an eye, etc. In order to facilitate ease of use, it is preferred that the sensor 32 be incorporated within a wearable garment such as a data jacket, a data glove, a shoe, a head band, a wrist band, an ankle band, etc., to be worn by the user to sense movement of the body member. It is further preferred to employ a plurality of sensors to simultaneously sense the movement of a plurality of body members of the user.

The sensor 32 and the image processor 20 are operatively associated with an animated character generator 34. The animated character generator 34 generates an animated character within the perspective corrected image sequence based upon a control signal derived from the sensor signal and the image signal representative of the perspective corrected image sequence. The sensor signal may be directly applied to the animated character generator 34 to provide the control signal. Alternatively, the sensor signal may be processed by a processor 36, interposed between the sensor 32 and the animated character generator 34, in order to form the control signal.

The animated character generator 34 produces an animated character having at least one graphical member which moves in dependence upon the control signal. Preferably, the at least one graphical member includes a first graphical member which corresponds to the body member being sensed by the sensor 32. Here, the animated character generator 34 moves the first graphical member in dependence upon the control signal so that the first graphical member coherently follows movement of the body member in real-time. Preferably, the animated character generator 34 moves a plurality of graphical members to coherently follow movements of a plurality of body members of the user.

Optionally, the user interface 30 may be operatively associated with the animated character generator 34 so that the user may select the animated character from a plurality of animated characters. In particular, the user interface 30 provides a character selection signal to the animated character generator 34 in response to a selection by the user.

As a further option, the system includes a sensor 40 which senses a position or a physical location of the user in a physical space. The sensor 40 generates a sensor signal representative of the position or the location of the user. The sensor signal is processed by the processor 36 to form a selection signal indicative of the portion of the wide-angle image sequence, or more generally, the portion of the at least one wide-angle image from which the perspective corrected image is to be formed. The portion is determined based upon the position of the user with respect to a predetermined frame of reference. In particular, the selection signal is used to modify the perspective of the at least one perspective corrected image in order to follow the movement of the user.

The selection signal is applied to the image processor 20 for selecting the portion of the wide-angle image sequence, or more generally, the portion of the at least one wide-angle image, based upon the position of the user in the reference frame. As a result, the user may coherently traverse the at least one wide-angle image by varying his location (e.g. by walking) in the physical space. For example, if the user walks to his/her right or left, the animated character responds by moving to its right or left, and the pan angle of the perspective corrected image is modified. If the user walks forward or backward (as defined by the predetermined frame of reference) in the physical space, the animated character responds by moving forward or backward in the perspective corrected image, and the zoom of the perspective corrected image is modified. The processor 36 forms a selection signal which causes the image processor 20 to zoom in on a new portion of the wide-angle image sequence when the user moves backward in the physical space, and to zoom out to a different portion of the wide-angle image sequence when the user moves forward in the physical space.

To facilitate ease of use, the sensor 40 may be incorporated into a garment member, such as a belt, to be worn by the user. It is preferred that the sensor 40 and the sensor 32 communicate with the processor via a wireless means of communication, such as infrared or radio frequency communication, so as not to impede the user's mobility.

FIG. 3 is a flow chart of an embodiment of a method of producing an animated image sequence. The method includes a step 50 of processing a portion of at least one wide-angle image to form at least one perspective corrected image. As stated earlier, the at least one wide-angle image preferably includes a wide-angle image sequence having a subset of a spherical field of view greater than 120 degrees. The wide-angle image sequence may provide, for example, a live view of a predetermined environment within which a camera is situated.

The step 50 of processing may be preceded by a step of selecting the portion of the at least one wide-angle image. The portion is selected based upon commands given by the user via the user interface 30 and movements of the user sensed by the sensor 40. As a result, the user may select an initial portion of the at least one wide-angle image using the user interface 30, with the selected portion being modified by the processor 36 based upon movements of the user.

In particular, the step of selecting the portion of the at least one wide-angle image may be performed by first sensing a quantity related to a position of the user and generating a sensor signal based upon the quantity. Next, a step of processing the sensor signal to form a selection signal is performed. Finally, a step of selecting the portion of the at least one wide-angle image based upon the selection signal is performed. Preferably, the portion is selected to coherently traverse the at least one wide-angle image based upon the position of the user.

The method of producing the animated image sequence further includes a step 52 of receiving at least one control signal, and a step 54 of generating an animated character within the at least one perspective corrected image. The animated character has at least one graphical member which moves in dependence upon the at least one control signal. The animated image sequence is formed by the animated character generated within the at least one perspective corrected image.

Preferably, the at least one graphical member includes a first graphical member which corresponding to a body member of the user. Here, the step of generating the animated character may be performed by sensing a quantity related to a position of the body member of the user, generating a first control signal based upon the quantity, and moving the first graphical member in dependence upon the first control signal. By performing these steps, the first graphical member can be commanded to coherently follow movement of the body member in real-time.

FIG. 4 is an illustration of a single image of an animated image sequence formed in accordance with embodiments of the present invention. A user 60 wears a right wrist-band sensor 62 to sense the location of his right arm, a left wrist-band sensor 64 to sense the location of his left wrist, two ankle-band sensors 66 and 68 to sense the location of his feet, and a belt sensor 70 to sense his location within a physical space 72. The sensors 62, 64, 66, 68, and 70 may utilize any one of a variety of different approaches known in the art for sensing location. In a preferred embodiment, the sensors 62, 64, 66, 68, and 70 sense the locations electromagnetically.

The sensed locations are transmitted to an animation system 74 in accordance with embodiments of the present invention. Preferably, the sensed locations are in the form of sensor signals which are transmitted wirelessly to the animation system 74. Using the sensor signals, the animation system 74 produces a signal representative of an animated image sequence for application to a display device 76.

A single image of the animated image sequence displayed on the display device 76 is indicated by reference numeral 80. In this illustration, the user 60 has selected a wide-angle image sequence showing activity in a Parisian cafe. The wide-angle image sequence may be provided to the animation system 74 in accordance with the disclosure of the copending "Method and System for Broadcasting an Interactively Viewable Program" application. For the purpose of illustration, the wide-angle image sequence is assumed to be captured live and transmitted to the animation system 74 in real-time, although the wide-angle image sequence could also be prestored.

Contained within the single image 80 is an animated character having a plurality of graphical members, including two arms and two legs. The user 60 can control the movement of the two arms and the two legs of the animated character by moving his own arms and legs. As illustrated, the user 60 has his right arm extended, which causes the animated character to extend its graphical right arm. The user 60 may be extending his arm to point out a tree in the Parisian cafe.

FIG. 5 is an illustration of another single image 78 of an animated image sequence formed in accordance with embodiments of the present invention. Here, the user 60 has moved back in the physical space 72 and has extended his left arm instead of his right arm. The belt sensor 70 senses the change in location of the user 60, and the right wrist-band sensor 62 and the left wrist-band sensor 64 sense the change in the location of the user's arms. The animation system 74, as a result, selects a new portion of the wide-angle image sequence so that the animated character is substantially centered therewithin. Further, the animated character is reduced in size to illustrate its new position within the image. Alternatively, the animation system 74 could have zoomed in on the new portion of the wide-angle image sequence. Also, the animated character is illustrated as extending its graphical left arm.

Embodiments of the present invention may be utilized in a variety of different applications. The present invention may be utilized by a user for teletravel or other forms of telepresence to project himself or herself into a real (rather than a virtual) environment. In effect, the display device 76 provides a tele-porthole to this real environment.

Thus, there has been described herein a concept, as well as several embodiments including preferred embodiments of a method and system for producing an animated image sequence using at least one wide-angle image.

Because the various embodiments of methods and systems for producing an animated image sequence are capable of both generating an animated character and processing a wide-angle image sequence in real-time, they provide a significant improvement in that real-time interaction is possible between the animated character and a distant real-world environment.

Additionally, the various embodiments of the present invention as herein-described use sensors to sense the location of various body members of the user, and a processor for automatically selecting a portion of the wide-angle image sequence to be processed based upon the location. As a result, a wide-angle image sequence may be traversed automatically in response to movement of the user within a physical space.

It will be apparent to those skilled in the art that the disclosed invention may be modified in numerous ways and may assume many embodiments other that the preferred form specifically set out and described above.

Accordingly, it is intended by the appended claims to cover all modifications of the invention which fall within the true spirit and scope of the invention.

What is claimed is:

1. A system for producing an animated image sequence, the system comprising:
    an image processor which processes a portion of at least one wide-angle image to form an image signal representative of at least one perspective corrected image; and
    an animated character generator responsive to the image signal and at least one control signal, the animated character generator generating an animated character within the at least one perspective corrected image, the animated character having at least one graphical member which moves in dependence upon the at least one control signal;
    wherein, within the animated image sequence, the portion of the at least one wide-angle image processed by the image processor is modified to facilitate interaction with the animated character.

2. The system of claim 1 wherein the at least one wide-angle image has a field of view greater than 120 degrees.

3. The system of claim 1 wherein the at least one wide-angle image includes a wide-angle image sequence.

4. The system of claim 3 wherein the wide-angle image sequence provides a live view of an environment.

5. The system of claim 1 further comprising a user interface operatively associated with the image processor for selecting the portion of the at least one wide-angle image, wherein the portion of the at least one wide-angle image is modified within the animated image sequence based on a change in a physical location of a user.

6. The system of claim 1 wherein the animated character generator superimposes the animated character onto the at least one perspective corrected image.

7. The system of claim 1 further comprising a sensor which senses a quantity based upon a position of a body member of a user and generates a sensor signal based upon the quantity, the sensor operatively associated with the animated character generator, wherein the at least one control signal includes a first control signal based upon the sensor signal.

8. The system of claim 7 wherein the at least one graphical member includes a first graphical member corresponding to the body member of the user, wherein the first graphical member moves in dependence upon the first control signal.

9. The system of claim 1 further comprising a sensor which senses a position of a user and generates a sensor signal based on the position, and a processor which processes the sensor signal to form a selection signal, the selection signal applied to the image processor for modifying, within the animated image sequence, the portion of the at least one wide-angle image based upon the sensor signal.

10. The system of claim 9 wherein the portion is modified within the animated image sequence in response to a change in the position of the user.

11. The system of claim 9 wherein the selection signal causes the image processor to zoom to a new portion of the at least one wide-angle image in response to a change in position of the user.

12. The system of claim 11 wherein the selection signal causes the image processor to pan to a new portion of the at least one wide-angle image in response to a change in position of the user.

13. A system for producing an animated image sequence, the system comprising:
    a first sensor which senses a position of a user and generates a first sensor signal based on the position;
    an image processor which processes a portion of a wide-angle image sequence in dependence upon the first sensor signal to form an image signal representative of a perspective corrected image sequence;
    a second sensor which senses a quantity based upon a position of a first body member of the user, the second sensor generating a second sensor signal based upon the quantity; and
    an animated character generator responsive to the image signal and the second sensor signal, the animated character generator generating an animated character within the perspective corrected image sequence, the animated character having a first graphical member corresponding to the first body member of the user which follows movement of the first body member in real-time based upon the second sensor signal.

14. A method of producing an animated image sequence, the method comprising the steps of:
    processing a portion of at least one wide-angle image to form at least one perspective corrected image;
    receiving at least one control signal; and
    generating an animated character within the at least one perspective corrected image to form the animated image sequence, the animated character having at least one graphical member which moves in dependence upon the at least one control signal;
    wherein, within the animated image sequence, the portion of the at least one wide-angle image formed in the step of processing is modified to facilitate interaction with the animated character.

15. The method of claim 14 wherein the at least one wide-angle image has a field of view greater than 120 degrees.

16. The method of claim 14 wherein the at least one wide-angle image includes a wide-angle image sequence.

17. The method of claim 16 wherein the wide-angle image sequence provides a live view of an environment.

18. The method of claim 14 further comprising the step of selecting the portion of the at least one wide-angle image, wherein the portion of the at least one wide-angle image is modified within the animated image sequence based on a change in a physical location of a user.

19. The method of claim 14 wherein the animated character is superimposed onto the at least one perspective corrected image.

20. The method of claim 14 wherein the at least one graphical member includes a first graphical member corresponding to a body member of a user, the method further comprising the steps of:
    sensing a quantity based upon a position of the body member of a user;
    generating a first control signal based upon the quantity; and
    moving the first graphical member in dependence upon the first control signal.

21. The method of claim 14 further comprising the steps of:

sensing a quantity based upon a position of a user;

generating a sensor signal based upon the quantity;

processing the sensor signal to form a selection signal; and modifying, within the animated image sequence, the portion of the at least one wide-angle image based upon the selection signal.

22. The method of claim 21 wherein the portion is modified within the animated image sequence in response to a change in the position of the user.

23. The method of claim 21 wherein the step of modifying the portion includes zooming to a new portion of the at least one wide-angle image in response to a change in position of the user.

24. The method of claim 21 wherein the step of modifying the portion includes panning to a new portion of the at least one wide-angle image in response to a change in position of the user.

* * * * *

UNITED STATES PATENT AND TRADEMARK OFFICE
CERTIFICATE OF CORRECTION

PATENT NO. : 5,706,421
DATED : January 6, 1998
INVENTOR(S) : Reber et al.

It is certified that error appears in the above-indentified patent and that said Letters Patent is hereby corrected as shown below:

Column 1, line 2, and on the title page, item [54]
    title, "REPRODUCING" should be --PRODUCING--.

In figure 2 and on front page of patent, "SQEQUENCE" should be --SEQUENCE--.

Signed and Sealed this

Eightcenth Day of January, 2000

Attest:

Q. TODD DICKINSON

*Attesting Officer*  *Commissioner of Patents and Trademarks*